United States Patent [19]

Davidson

[11] Patent Number: 4,956,905
[45] Date of Patent: Sep. 18, 1990

[54] TOOL FOR HOLDING A ROTATABLE LAWN MOWER BLADE

[76] Inventor: Leonard D. Davidson, 301 East St., Farmersville, Ill. 62533

[21] Appl. No.: 443,749

[22] Filed: Nov. 30, 1989

[51] Int. Cl.[5] ............................................. B23Q 3/00
[52] U.S. Cl. ................................................. 29/281.1
[58] Field of Search .................. 76/82.1; 254/17, 131, 254/15; 29/267, 240, 281.1, 270; 51/221 BS, 222; 248/228, 231.7

[56] References Cited

U.S. PATENT DOCUMENTS

| | | | |
|---|---|---|---|
| 2,082,948 | 6/1937 | Gerdin | 76/82.1 |
| 2,438,766 | 3/1948 | Rifenberg | 254/17 |
| 2,976,602 | 3/1961 | Nelson. | |
| 3,061,980 | 11/1962 | Machovec. | |
| 3,070,877 | 1/1963 | Schumann | 29/267 |
| 3,101,629 | 8/1963 | Koelndorfer. | |
| 3,122,354 | 2/1964 | Rodeback | 254/131 |
| 3,574,268 | 4/1971 | Buse. | |
| 3,826,159 | 7/1974 | Otto. | |
| 4,149,693 | 4/1979 | LoNigro | 248/228 |
| 4,564,991 | 1/1986 | Taylor. | |
| 4,621,791 | 11/1986 | Staskiewicz et al. | 254/17 |
| 4,736,544 | 4/1988 | Greenquist. | |
| 4,762,278 | 8/1988 | Taylor. | |
| 4,882,960 | 11/1989 | Kugeer | 76/82.1 |

Primary Examiner—Robert C. Watson
Attorney, Agent, or Firm—McCaleb, Lucas & Brugman

[57] ABSTRACT

A tool for holding a lawn mower blade in a mower during removal and replacement. The tool comprises a U-shaped bracket having a horizontal web and a pair of upstanding horizontally-spaced flanges. A bolt extends through bolt holes in the flanges at a level above the web. The web, flanges, and bolt encircle the lawn mower blade and define a space for retaining an end portion of the lawn mower blade. Alternate bolt hole arrangements in the flanges enable the bolt to be repositioned at different spacings and angles relative to the web, to accommodate lawn mower blades having different size air vanes with different angular dispositions. An elongated handle is attached to the underside of the web and is offset downwardly to clear the bottom edge of the skirt of a lawn mower housing.

8 Claims, 2 Drawing Sheets

TOOL FOR HOLDING A ROTATABLE LAWN MOWER BLADE

BACKGROUND OF THE INVENTION

For peak efficiency, lawn mower blades should be resharpened or replaced regularly. Removing a blade retaining nut which has been overtightened or rusted in place can be difficult at best, and even dangerous.

The problem is to lock the blade positively against rotation so the high torque necessary to loosen the nut can be applied with a long wrench. Typically, a block of wood, a brick, or other handy object is placed between the blade and discharge chute. If the block slips, a cut or bruised hand may result. Holding the blade with a gloved hand does not guarantee enough leverage to loosen the nut.

The problem is further compounded by the ground level location of the blade and it is only limitedly visible and accessible through the discharge chute unless it is run up on blocks, elevated on jacks, tilted backwardly, or turned upside down.

As a practical matter, a heavy riding mower is generally not elevated on blocks just to remove the blades for sharpening. Instead, the mower deck is elevated as far as it will go, which will give about 5" of visibility and working space for a person lying or crouching on the ground.

One attempt to solve this problem of holding the blade is described in Taylor Patent No. 4,564,991 issued Jan. 21, 1986 on "TOOL FOR HOLDING A BLADE FOR INSTALLATION AND REMOVAL THEREOF". This involves use of a special tool which works only if the mower is turned upside down; as a result it can be used only with very light weight lawn mowers. However, it is unsafe to turn any mower upside down without first draining the tank, because of the hazard of leaking fuel. The tool shown in that patent engages the mower blade between a pair of stop pins. It could not be used effectively in the limited visibility and accessibility conditions under a riding mower. The tool would fall off because of the open space between the stop pins.

Brief Summary of the Invention

Accordingly, it is a general object of the present invention to provide a tool which will positively hold a mower blade so the retaining nut can be removed when the mower is upright on ground level in the case of a riding mower, or tilted backwardly enough to expose the underside without causing a gas line leak in the case of a light weight push mower.

Another object is to provide such a tool which is simple and effective to use in the limited space between the mower deck and ground when the mower is upright.

Another object is to provide such a tool which is easy to fit onto a mower blade even in the limited space and limited visibility beneath an upright mower, and will not fall off because it completely encircles the mower blade, so the user can concentrate his attention on loosening the retaining nut.

Brief Description of the Drawing

Other objects and advantages of the present invention will be apparent from the following description taken in connection with the accompanying drawings.

Like parts are designated by like reference numerals throughout the figures of the drawing.

Detailed Description of the Preferred Embodiment

Figure 1:
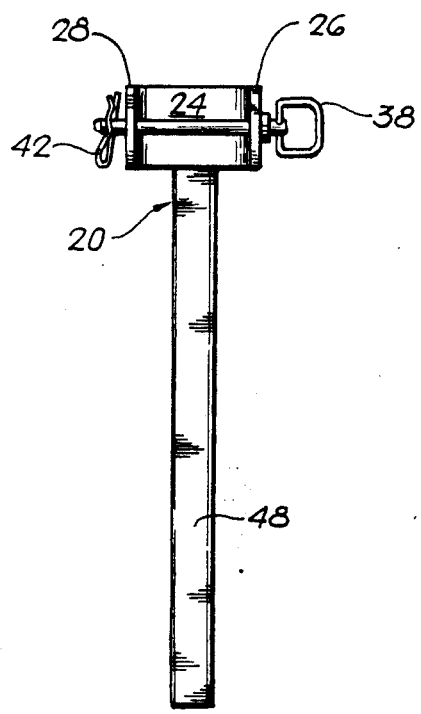
FIG. 1 is a top plan view of a lawn mower blade holding tool illustrating a preferred form of the invention.
Figure 2:
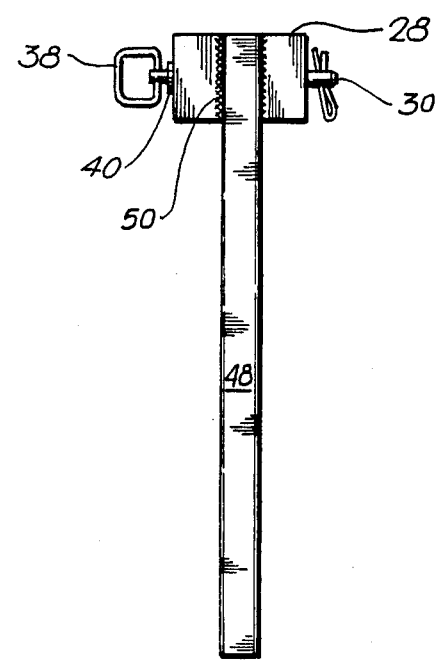
FIG. 2 is a bottom plan view thereof.
Figure 3:
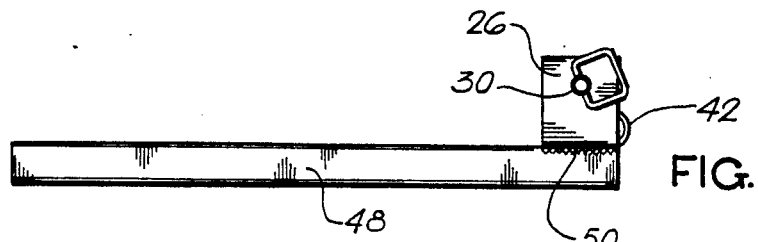
FIG. 3 is a right side elevational view thereof.
Figure 4:
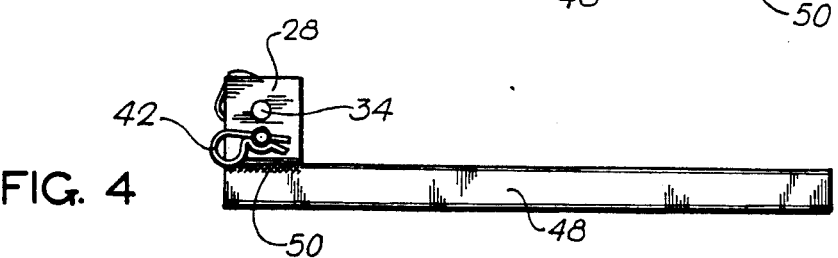
FIG. 4 is a left side elevational view thereof.
Figure 5:
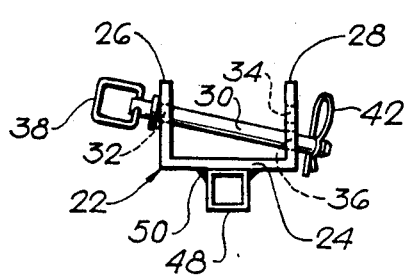
FIG. 5 is a front end elevational view thereof.

Referring more specifically to the drawing, a preferred embodiment of the lawn mower blade holding tool of the present invention is generally designated 20.

The lawn mower blade holding tool comprises a square corner, U-shaped bracket 22 having a horizontal web or base 24 and a pair of upstanding, parallel, horizontally-spaced flanges 26, 28. A blade retaining bolt 30 extends through bolt hole means in the flanges, this particular bolt hole means being illustrated as a pair of bolt holes 32 and 34 in the right hand flange 26 and a bolt hole 36 in the left hand flange 28.

Bolt 30 has a loop handle 38 with a collar 40 at one end and a retainer spring pin 42 extending through an opening in the other end. The particular bolt hole arrangement shown is to accommodate different, standard lawn mower blades. While the width of a standard blade 44 is 2½" as shown is FIG. 7, the height varies because of different sizes and styles of air vanes 46. Two styles of air vanes are shown in broken lines in FIGS. 6 and 7.

Figure 6:
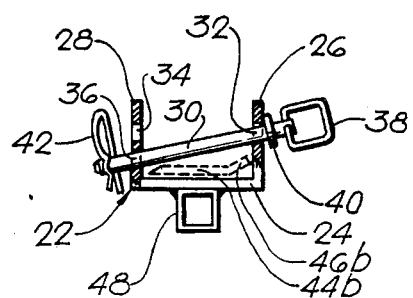
FIG. 6 is a rear end elevational view thereof with a lawn mower blade shown in broken lines therein; and with the bracket sectioned locally to better illustrate the bolt hole means.
Figure 7:
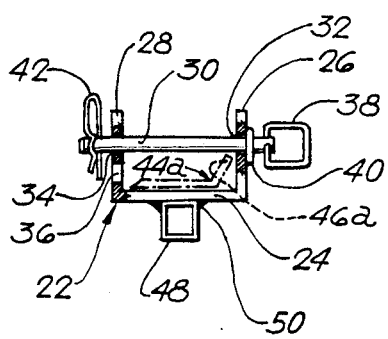
FIG. 7 is a rear end elevational view similar to FIG. 6 showing the tool re-adjusted for a different size lawn mower blade, also shown in broken lines therein.

As shown in broken lines in FIG. 7, the blade 44a has a high, steep angle air vane 46a; and as shown in FIG. 6, the blade 44b has a low, shallow-angle air vane 46b. To accommodate the two styles of lawn mower blades, bolt 30 extends through bolt holes 32 and 36 in FIG. 6, and through bolt holes 32 and 34 in FIG. 7. Other bolt hole arrangements may be used as appropriate, for example, for uniformity in manufacture, each of the flanges 26 and 28 may have two bolt holes corresponding to those numbered 34 and 36. Alternatively, more than two bolt holes may be provided in each flange.

An elongated handle 48 is affixed as by welding at 50 to the underside of the web 24. This sufficiently offsets the handle to a level downwardly from the bracket 22 to clear the bottom edge of the skirt of a lawn mower housing.

Figure 9:
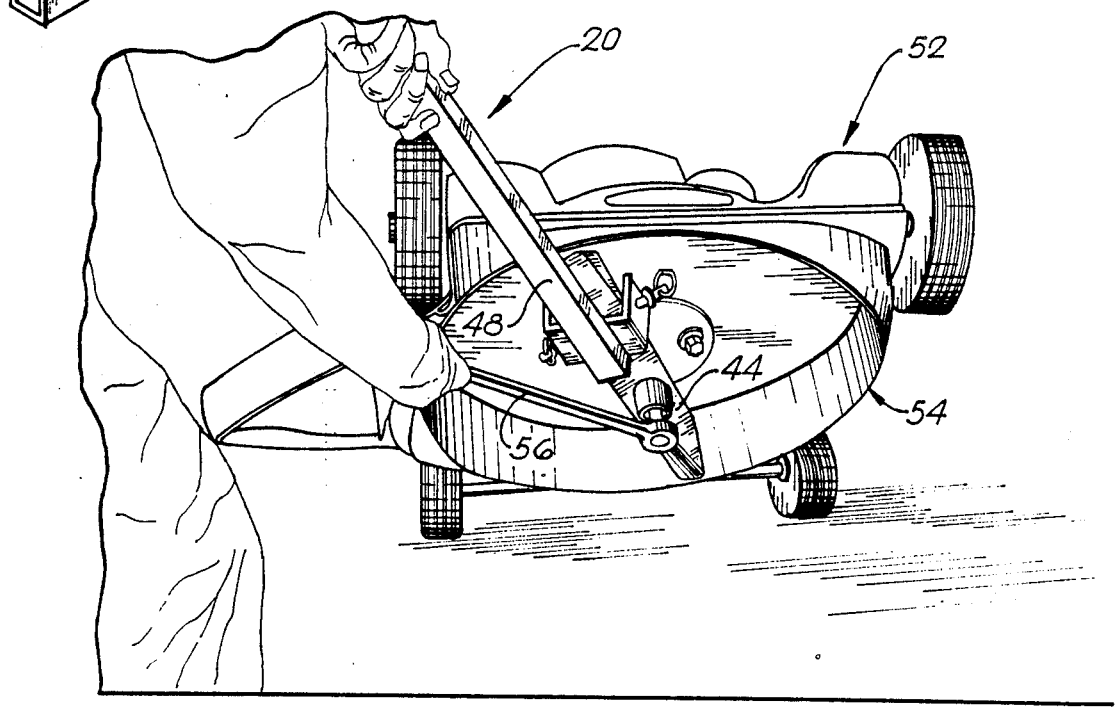
FIG. 9 is a perspective view of a push type lawn mower tilted backwardly to expose the underside and with the tool in use holding the lawn mower blade while the blade retaining nut is being removed.

Use and operation is believed to be apparent in view of the above. Briefly, referring to FIG. 9, a small, push-type mower 52 may be tilted backwardly to expose the blade 44 without causing gasoline spillage. By connecting the bolt 30 in one or the other of the positions shown in FIGS. 6 and 7, the tool 20 can be slid onto the end of the blade with the handle 48 offset downwardly to clear the under edge 54 of the lawn mower skirt 56. A long wrench 56 can then be fitted over the retaining nut and turned while the blade is held solidly by the tool 20, to loosen the nut and remove the blade.

Similarly, the blades on a large, riding type mower (not shown) may be removed, but without tilting or elevating the mower. In this case, the mower deck would be raised as far as possible (about 5" above the ground), and the tools 20 and 56 would be manipulated in the space below the mower deck.

Figure 8:
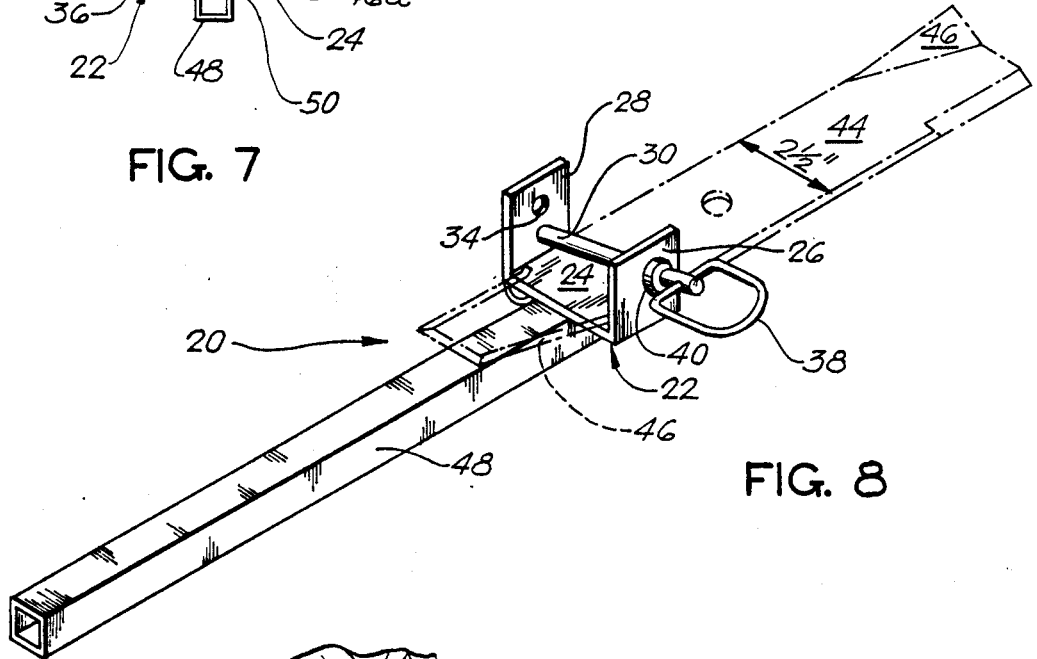
FIG. 8. is a perspective view of the tool engaged with a lawn mower blade.

One very important feature of this tool, as contrasted with the wooden blocks previously used, and the tool shown in U.S. Pat. No. 4,564,991, is that, once it has been slid onto the blade as shown in FIGS. 7 and 8, it cannot fall off. This is especially advantageous where there is limited accessibility and visibility between the mower deck and the ground.

The embodiment described and shown to illustrate the present invention has been necessarily specific for purposes of illustration. Alterations, extensions and modifications would be apparent to those skilled in this art. The aim of the appended claims, therefore, is to cover all variations included within the spirit and scope of the invention.

The embodiments of the invention in which an exclusive property or privilege is claimed are defined as follows:

1. A tool for holding a rotatable lawn mower blade having cutter and air vane formations along leading and lagging edges at opposite end portions thereof, the lawn mower blade holding tool comprising:
   a U-shaped bracket having a horizontal web and a pair of upstanding, horizontally-spaced flanges parallel to and spaced equidistantly from a central vertical plane;
   said flanges having bolt hole means spaced upwardly from said web;
   retainer bolt means extending through said bolt hole means;
   said web, flanges and retainer bolt means adapted to surround and retain a lawn mower blade and to define a retaining space for an end portion of the blade; and
   an elongated handle rigidly fixed to the underside of the web and extending horizontally from said bracket along said central vertical plane and being offset downwardly to a level below the web to clear the bottom edge of the skirt of a lawn mower housing while a lawn mower blade is retained in said space;
   whereby the tool is engageable with a lawn mower blade in a lawn mower housing to hold the blade against rotation during removal and replacement.

2. A tool for holding a rotatable lawn mower blade according to claim 1 in which the handle extends along a horizontal axis parallel to said web.

3. A tool for holding a rotatable lawn mower blade having cutter and air vane formations along leading and lagging edges at opposite end portions thereof, the lawn mower blade holding tool comprising:
   a U-shaped bracket having a horizontal web and a pair of upstanding, horizontally-spaced flanges;
   said flanges having bolt hole means spaced upwardly from said web;
   retainer bolt means extending through said bolt hole means;
   said web, flanges and retainer bolt means adapted to surround and retain a lawn mower blade and defining a retaining space for an end portion of the blade;
   said bolt hole means includes at least two vertically spaced bolt holes in one of said flanges and at least one bolt hole in the other flange at a level approximating that of the uppermost one of said at least two bolt holes in said one flange to enable variable angular disposition of said bolt means to accommodate lawn mower blades having air vanes of different sizes and angular dispositions; and
   an elongated handle extending from said bracket and being offset downwardly to a level below the web to clear the bottom edge of the skirt of a lawn mower housing while a lawn mower blade is retained in said space;
   whereby the tool is engageable with a lawn mower blade in a lawn mower housing to hold the blade against rotation during removal and replacement.

4. A tool for holding a rotatable lawn mower blade according to claim 3 in which said one flange is on the left side of the bracket for engagement with the lawn mower blade leading edge.

5. A tool for holding a rotatable lawn mower blade according to claim 3 in which said other flange is on the right side of the bracket for engagement with the lawn mower blade lagging edge.

6. A tool for holding a rotatable lawn mower blade having cutter and air vane formations along leading and lagging edges at opposite end portions thereof, the lawn mower blade holding tool comprising:
   a U-shaped bracket having a horizontal web and a pair of upstanding, horizontally-spaced flanges;
   said flanges having bolt hole means spaced upwardly from said web;
   retainer bolt means extending through said bolt hole means;
   means for adjusting the spacing of the bolt means above the web to accommodate different thicknesses of lawn mower blades;
   said web, flanges and retainer bolt means adapted to surround and retain a lawn mower blade and defining a retaining space for an end portion of the blade; and
   an elongated handle extending from said bracket and being offset downwardly to a level below the web to clear the bottom edge of the skirt of a lawn mower housing while a lawn mower blade is retained in said space;
   whereby the tool is engageable with a lawn mower blade in a lawn mower housing to hold the blade against rotation during removal and replacement.

7. A tool for holding a rotatable lawn mower blade having cutter and air vane formations along leading and lagging edges at opposite end portions thereof, the lawn mower blade holding tool comprising:
   a U-shaped bracket having a horizontal web and a pair of upstanding, horizontally-spaced flanges;
   said flanges having bolt hole means spaced upwardly from said web;
   retainer bolt means extending through said bolt hole means;
   said web, flanges and retainer bolt means adapted to surround and retain a lawn mower blade and defining a retaining space for an end portion of the blade;
   said flanges include means for adjusting the spacing and the angularity of the bolt means relative to the web to accommodate lawn mower blades having air vanes of different sizes and angular dispositions; and an elongated handle extending from said bracket and being offset downwardly to a level below the web to clear the bottom edge of the skirt of a lawn mower housing while a lawn mower blade is retained in said space;

whereby the tool is engageable with a lawn mower blade in a lawn mower housing to hold the blade against rotation during removal and replacement.

8. A tool for holding a rotatable lawn mower blade having cutter and air vane formations along leading and lagging edges at opposite end portions thereof, the lawn mower blade holding tool comprising:

a U-shaped bracket having a horizontal web and a pair of upstanding, horizontally-spaced flanges;

said flanges having bolt hole means spaced upwardly from said web;

retainer bolt means extending through said bolt hole means;

said web, flanges and retainer bolt means adapted to surround and retain a lawn mower blade and defining a retaining space for an end portion of the blade;

said bolt hole means includes a plurality of vertically spaced bolt holes in at least one of said flanges to enable angular adjustment of the bolt means to accommodate lawn mower blades having air vanes of different sizes and angular dispositions; and an elongated handle extending from said bracket and being offset downwardly to a level below the web to clear the bottom edge of the skirt of a lawn mower housing while a lawn mower blade is retained in said space;

whereby the tool is engageable with a lawn mower blade in a lawn mower housing to hold the blade against rotation during removal and replacement.

* * * * *